United States Patent
Tsai et al.

(10) Patent No.: US 12,094,274 B2
(45) Date of Patent: Sep. 17, 2024

(54) SYSTEMS AND METHODS FOR RENDERING AND OPERATING VIRTUAL VEHICLES

(71) Applicant: Toyota Connected North America, Inc., Plano, TX (US)

(72) Inventors: David Tsai, Irvine, CA (US); Will Hargis, Celina, TX (US)

(73) Assignee: Toyota Connected North America, Inc., Plano, TX (US)

(*) Notice: Subject to any disclaimer, the term of this patent is extended or adjusted under 35 U.S.C. 154(b) by 93 days.

(21) Appl. No.: 17/935,722

(22) Filed: Sep. 27, 2022

(65) Prior Publication Data
US 2024/0104982 A1 Mar. 28, 2024

(51) Int. Cl.
*G07C 5/12* (2006.01)
*G06T 19/00* (2011.01)

(52) U.S. Cl.
CPC .............. *G07C 5/12* (2013.01); *G06T 19/00* (2013.01)

(58) Field of Classification Search
None
See application file for complete search history.

(56) References Cited

U.S. PATENT DOCUMENTS

| | | | | |
|---|---|---|---|---|
| 2022/0027963 | A1* | 1/2022 | Isaac | G06Q 10/20 |
| 2023/0102762 | A1* | 3/2023 | Majumder | G08C 17/02 |
| | | | | 701/31.4 |
| 2023/0281688 | A1* | 9/2023 | Errama | G06T 19/003 |
| | | | | 705/69 |
| 2023/0351680 | A1* | 11/2023 | Helfgott | B33Y 10/00 |

FOREIGN PATENT DOCUMENTS

CN 113935840 A 1/2022

* cited by examiner

*Primary Examiner* — Frank S Chen
(74) *Attorney, Agent, or Firm* — DINSMORE & SHOHL LLP

(57) ABSTRACT

Systems and methods for generating vehicle profiles and rendering and operating a virtual world are disclosed. In one embodiment, a method of generating a vehicle profile for operating a virtual vehicle in a virtual environment includes receiving vehicle sensor data from at least one sensor corresponding to a physical vehicle, determining at least one vehicle performance attribute from the vehicle sensor data, and storing the at least one vehicle performance attribute in the vehicle profile. The vehicle profile is operable to be used to render the virtual vehicle in the virtual environment based at least in part on the vehicle profile, and to operate the virtual vehicle in the virtual environment based at least in part on the vehicle profile.

17 Claims, 5 Drawing Sheets

SYSTEMS AND METHODS FOR RENDERING AND OPERATING VIRTUAL VEHICLES

TECHNICAL FIELD

The present specification relates to virtual worlds and, more particularly, to rendering and operating virtual vehicles in virtual worlds.

BACKGROUND

Virtual worlds are computerized environments where users can interact with each other and objects using avatars. Virtual objects are available in virtual worlds to use. For example, a user may wear virtual clothing and virtual shoes. The virtual objects may look like and operate similarly to their real-world counterparts. However, the virtual objects may not operate in the virtual worlds in a manner that is similar to the operation of corresponding physical objects in the physical world.

Accordingly, systems and methods for rendering and operating virtual objects may be desired.

SUMMARY

In one embodiment, a method of generating a vehicle profile for operating a virtual vehicle in a virtual environment includes receiving vehicle sensor data from at least one sensor corresponding to a physical vehicle, determining at least one vehicle performance attribute from the vehicle sensor data, and storing the at least one vehicle performance attribute in the vehicle profile. The vehicle profile is operable to be used to render the virtual vehicle in the virtual environment based at least in part on the vehicle profile, and to operate the virtual vehicle in the virtual environment based at least in part on the vehicle profile.

In another embodiment, a method of operating a virtual vehicle in a virtual environment includes receiving a vehicle profile corresponding to a physical vehicle, wherein the vehicle profile includes at least one vehicle performance attribute derived from vehicle sensor data from at least one sensor of the physical vehicle, rendering the virtual vehicle in the virtual environment based at least in part on the vehicle profile, and operating the virtual vehicle in the virtual environment based at least in part on the vehicle profile.

In yet another embodiment, a system of operating a virtual vehicle in a virtual environment includes one or more processors, and a non-transitory, computer-readable medium storing instructions that, when executed by the one or more processors, cause the one or more processors to receive a vehicle profile corresponding to a physical vehicle, wherein the vehicle profile includes at least one vehicle performance attribute derived from vehicle sensor data from at least one sensor of the physical vehicle, render the virtual vehicle in the virtual environment based at least in part on the vehicle profile, and operate the virtual vehicle in the virtual environment based at least in part on the vehicle profile.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
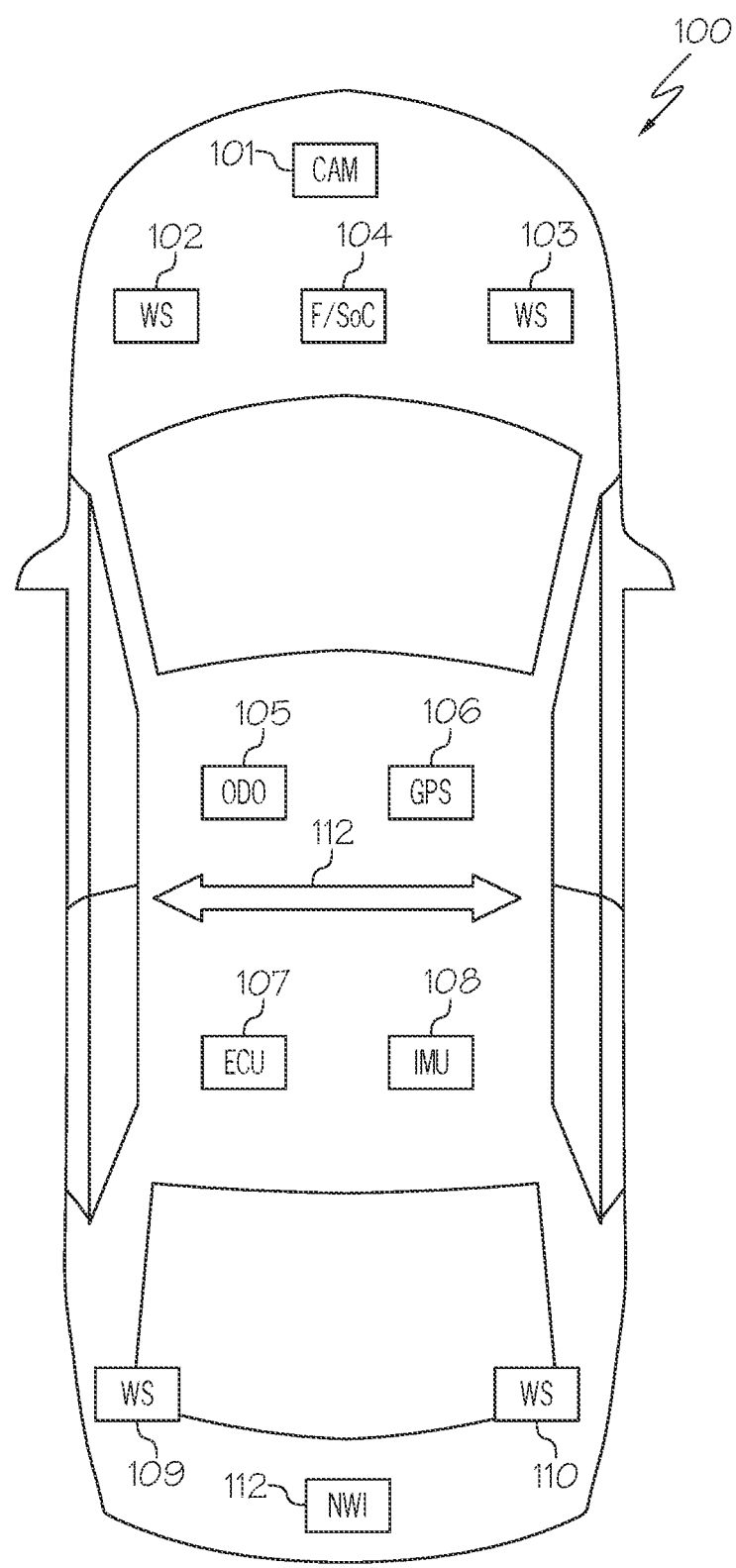
FIG. 1 illustrates a physical vehicle according to one or more embodiments described and illustrated herein.
Figure 2:
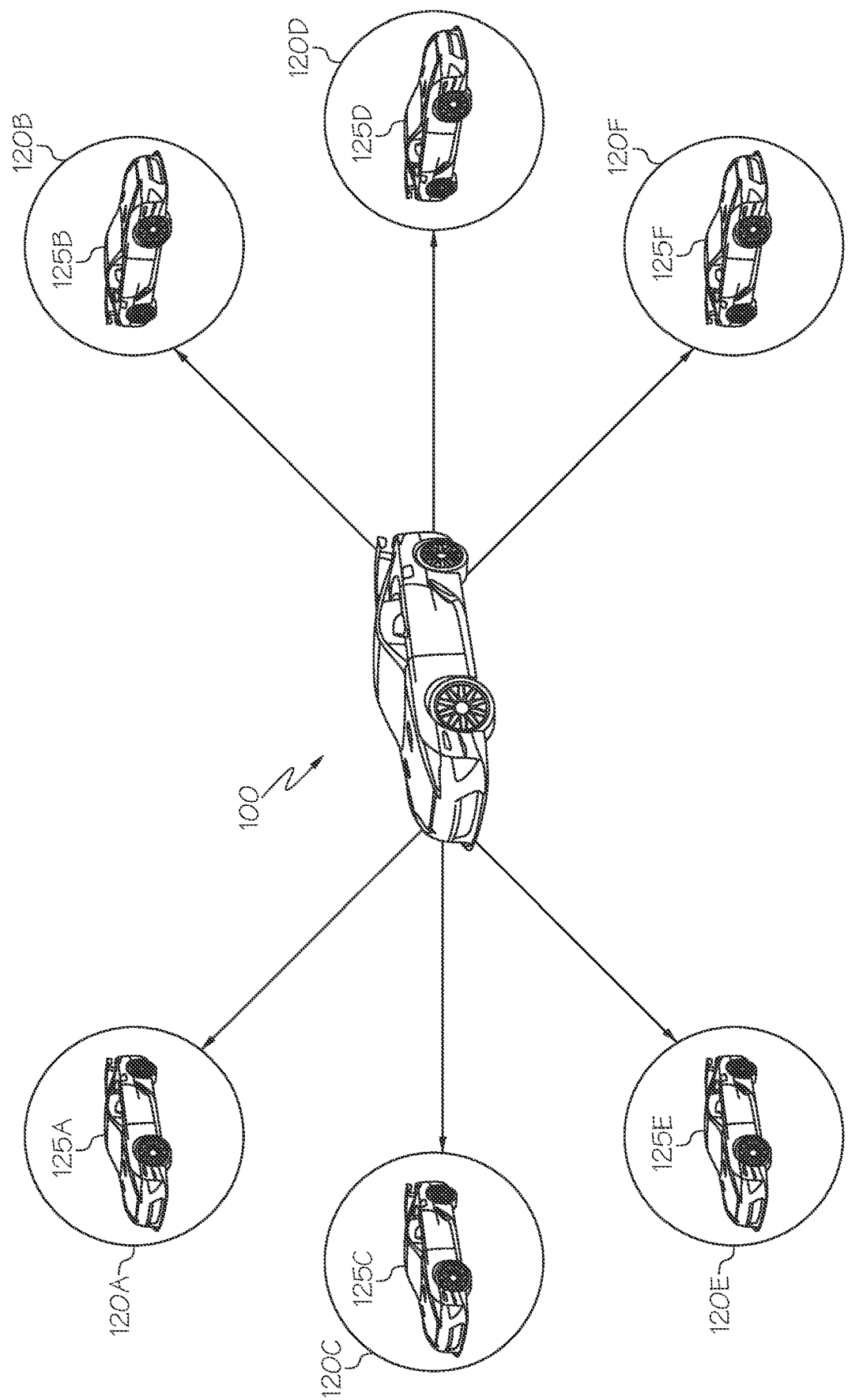
FIG. 2 illustrates a physical vehicle and a plurality of virtual vehicles rendered in a plurality of virtual worlds according to one or more embodiments described and illustrated herein.

The embodiments disclosed herein describe systems and methods for generating vehicle profiles corresponding to the performance of individual physical vehicles, and also rendering and operating virtual vehicles in virtual environments based on the vehicle profiles.

The "metaverse" is made up of one or more virtual worlds operating on computer networks. Non-limiting examples of virtual worlds include Second Life™ operated by Linden Research Inc. of San Francisco, CA, Minecraft® operated by Microsoft, Inc. of Redmond, WA, Roblox® operated by the Roblox Corporation of San Mateo, CA, Fortnite® operated by Epic Games of Cary, NC, The Sims® operated by Electronic Arts of Redwood City, CA, and The Sandbox operated by Pixowl of Hong Kong. Users may experience the metaverse using one or more avatars that represent them. Avatars may interact with one another in the virtual worlds.

Virtual objects may also be created, used and exchanged within the virtual worlds. For example, a user may purchase virtual articles of clothing, such as jeans and shoes. The jeans and shoes have certain attributes, such as size, color, shape, texture. In some cases, the virtual objects may correspond to actual physical objects. For example, a shoe company may make a certain model of a physical shoe, and also sell a virtual shoe having similar characteristics to the physical shoe. As a further example, a user may receive a virtual shoe in the form of a non-fungible token when purchasing the physical shoe. The non-fungible token may be used to unlock the virtual shoe in one or more virtual worlds so that the user's avatar may "wear" the shoe.

Virtual worlds may be very large. For example a virtual world may be defined by thousands of "lands." Without teleportation, it may be difficult to travel long distances within the virtual world. Virtual objects in the form of transportation vehicles, such as cars, trucks, busses, planes, boats, and the like may be available for ownership and/or rental for mobility within the virtual worlds. For example, a user's avatar may purchase a ticket on a virtual plane to fly from one location to another. As another example, a user may use a virtual car to go on a road trip from one location to another.

In one example, a user may purchase a virtual vehicle for use within a vehicle world. There may be no corresponding physical vehicle in the physical world. In another example, a user may purchase a physical vehicle in the physical world, and receive a digital representation of the vehicle in the form of a virtual vehicle. The virtual vehicle may look similar physical vehicle that the user owns in the physical world. The virtual vehicle may be provided in a form of a non-fungible token that is stored on a blockchain, for example. The non-fungible token ensures that the virtual vehicle is authentic, and that it cannot be replicated.

Virtual worlds have an area defined by distances and elevations. Thus, a virtual vehicle can travel across a virtual landscape at a virtual speed. For example, a virtual vehicle may travel across a virtual landscape at an average speed of 100 kmh as a physical vehicle would travel across a physical landscape. A virtual vehicle traveling at an average speed of 100 kmh will travel 100 km in one hour. It is noted that distances in the virtual world may not have a one-to-one relationship to distances in the physical world. For example, 1 km in the physical world may be 0.5 km in a virtual world.

Although digital representations of virtual vehicles may look similar to corresponding physical vehicles (e.g., model, color, accessories, trim level, and/or the like), virtual vehicles do not perform in the same way within the virtual worlds. Particularly, a virtual vehicle will not perform in a virtual world in a manner similar as to how its corresponding physical vehicle performs in the physical world. No two physical vehicles perform exactly in the same manner. Wear and tear on a vehicle over time will cause the vehicle to perform differently than when it was brand new. Additionally, modifications to the vehicle (e.g., accessories, tune ups, part replacements, and/or the like) will cause the performance of the vehicle to change. For example, an aftermarket nitrous oxide system will cause the vehicle to increase its acceleration performance. As another example, new tires will cause the vehicle to handle differently than old tires. These types of differences of the physical vehicle are not represented by the virtual vehicle in the virtual worlds.

Embodiments of the present disclosure provide for vehicle profiles that store vehicle performance attributes that are derived from actual sensor data of vehicles. The vehicle profiles may be used to render and operate virtual vehicles that perform within virtual worlds in a manner similar to their corresponding physical vehicle counterparts. Thus, a physical vehicle owner may also have a virtual vehicle that has the same maximum speed, maximum acceleration, braking distance, handling, steering, and energy efficiency as the corresponding physical vehicle.

Various embodiments of systems and methods for generating vehicle profiles storing vehicle performance attributes, and rendering and operating virtual vehicles in virtual worlds according with vehicle profiles are described in detail below.

Referring now to FIG. 1, an example physical vehicle 100 and its example sensors and electronics is schematically illustrated. It should be understood that embodiments are not limited to any particular vehicle and any particular sensors. The physical vehicles described herein are not limited to cars, and may include trucks, busses, four-wheelers, two-wheelers, three-wheelers, planes, motorized equipment, boats, and the like.

The illustrated example physical vehicle 100 is a car of a particular make, model, trim level, and year. The physical vehicle 100 has one or more electronic control units 107 (e.g., processors) that are communicatively coupled (e.g., by a wired or wireless connection) to a vehicle communications bus 112 (e.g., a control area network (CAN) bus). A plurality of vehicle sensors are also communicatively coupled to the communications bus 112, and provide vehicle sensor data to the one or more electronic control units 107. Any number and type of vehicle sensors may be included in the physical vehicle 100. The example physical vehicle 100 of FIG. 1 includes four wheel sensors 102, 103, 109, and 110, one or more camera sensors 101, an energy sensor 104 providing data regarding remaining propulsion energy (e.g., a fuel gauge or a state of charge sensor that monitors the state of charge of a battery pack of an electric vehicle), an odometer 105, one or more global positioning sensors 106, one or more initial measurement units 108, and network interface hardware 112. It should be understood that more or fewer sensors may be used depending on the type of physical vehicle.

The various vehicle sensors produce vehicle data that are provided to the communications bus 112 and may be received by the one or more electronic control units 107. The electronic control units 107 and/or one or more processors of a remote computing device (not shown) may calculate vehicle performance attributes. Vehicle performance attributes are not limited by this disclosure. Non-limiting example vehicle performance attributes include fuel economy (e.g., MPG) or efficiency (e.g., MPGe) (collectively referred to herein as "energy efficiency"), maximum speed, acceleration (e.g., 0 mph to 60 mph), handling, braking distance, off-road capabilities, torque, horse power, suspension, roll center, weight distribution, rolling resistance, coefficient of friction, and/or the like. These performance attributes may be derived from the many sensors of the physical vehicle 100. As described in more detail below, the vehicle sensor data outputted by the various sensors are used to derive the vehicle performance attributes that are stored in a vehicle profile that is further used to render and operate a corresponding virtual vehicle in virtual worlds.

The one or more camera sensors 101 provides data regarding the surrounding environment of the physical vehicle 100, such as precipitation, light conditions, or any other environmental conditions. The environmental conditions may be used to produce vehicle performance attributes in different environmental conditions. For example, a first set of vehicle performance attributes (e.g., acceleration, speed, etc.) may be derived for elevated temperature during sunny conditions, a second set of vehicle performance attributes may be derived for rainy conditions, and a third set of vehicle performance attributes may be derived for snowy conditions. Visual data provided by the cameras may be used to determine the environmental conditions. Other sensors may also be used to determine environmental conditions, such as a vehicle temperature sensor. It is noted that external data may also be used to determine environmental conditions, such as third party weather data.

The wheel sensors 102 may be any type of wheel sensor, such as, without limitation, wheel speed sensors used to determine the speed of the vehicle and/or determine wheel speed for anti-lock brake systems, automatic transmission control systems, vehicle dynamic control systems, and the like. The vehicle data produced by the wheel sensors 102 may be used to derive handling attributes, such as how the physical vehicle 100 performs in various weather conditions, such as rainy or icy conditions. The wheel sensors 102 may be used as a speedometer of the vehicle, or a separate speedometer sensor may be used in some embodiments.

An energy sensor 104 provides information regarding how much propulsion energy remains. For an internal combustion engine or a fuel cell, the energy sensor 104 may be a fuel gauge that provides data regarding how much fuel is remaining. For a battery electric vehicle, the energy sensor 104 may be a state of charge sensor that provides data regarding a charge level of the battery pack.

The odometer sensor 105 provides information regarding the distance that the physical vehicle 100 travels. Data from the odometer sensor 105 and the energy sensor may be used to derive the efficiency of the physical vehicle. In some embodiments, the one or more electronic control units 107 calculates the efficiency. In other embodiments, a remote computing device uses vehicle data of the odometer sensor 105 and the energy sensor 104 to calculate the efficiency of the physical vehicle.

The global positioning sensor 106 provides location data regarding the location of the physical vehicle 100. The location data can be used to obtain other information, such as elevation. Energy efficiency of the physical vehicle 100 depends on the change in elevation of the road. A vehicle is highly efficient when travelling downhill and less efficient when traveling uphill. The energy efficiency of the physical vehicle 100 may be calculated for different road grades based on the locations traveled by the physical vehicle 100. This information may then be stored as one or more vehicle performance attributes in a vehicle profile.

One or more inertial measurement units 108 may also be provided on the physical vehicle 108. Non-limiting examples of inertial measurement units 108 include accelerometers and gyroscopes. The vehicle data from the one or more inertial measurement units 108, alone or in combination with vehicle data from other sensors) can be used to derive vehicle performance attributes, such as vehicle handling attributes. Vehicle data from the inertial measurement units 108 can be used to characterize how the physical vehicle 100 handles corners at various speeds, how it moves when accelerating or decelerating, and the like.

Network interface hardware 112 may also be provided to communicate data with remote computing devices. For example, vehicle sensor data and/or vehicle-calculated vehicle performance attributes may be communicated with one or more remote computing devices that create a vehicle profile of the physical vehicle 100 that is used to render and operate a virtual vehicle that represents the physical vehicle 100.

As stated above, the vehicle sensor data of the physical vehicle 100 are used to derive vehicle performance attributes that describe the performance of the physical vehicle 100 under various conditions. Thus, the vehicle performance attributes are used to model the movement of the physical vehicle 100. These vehicle performance attributes are stored in a digital vehicle profile that is used by virtual world computing systems to render and operate a virtual vehicle having vehicle performance attributes in one or more virtual worlds that are similar to the vehicle performance attributes of the physical vehicle 100 in the physical world.

Figure 3:
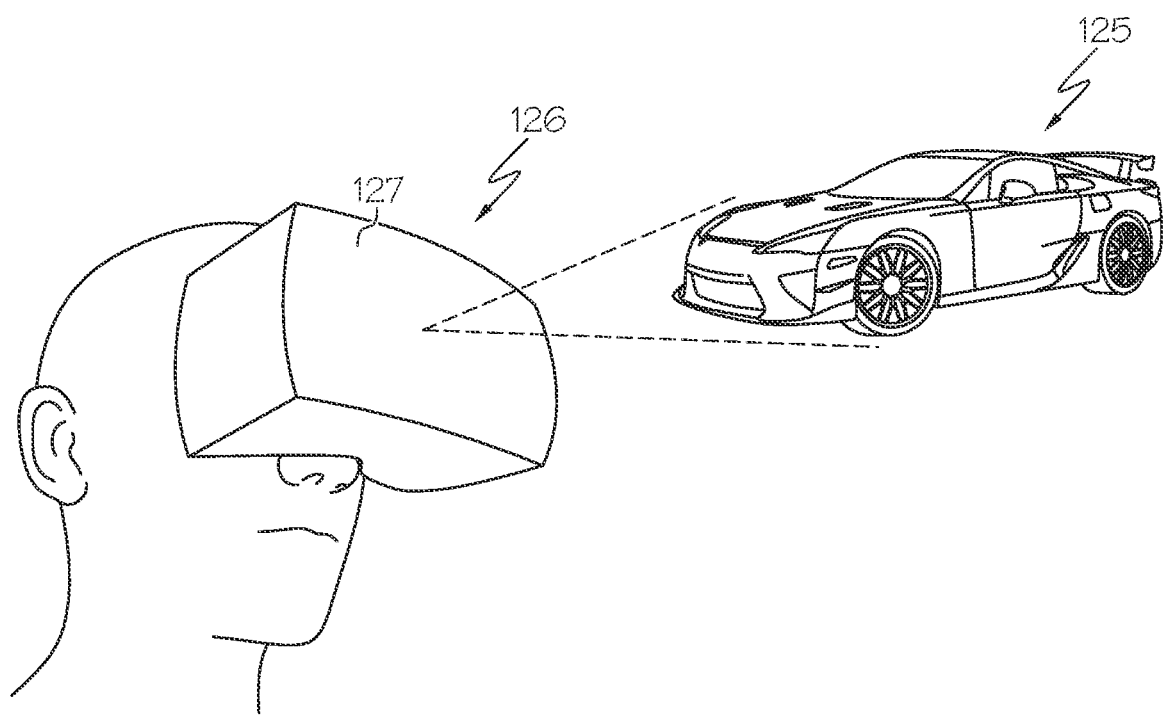
FIG. 3 illustrates a user viewing a virtual vehicle in a virtual world using a virtual reality headset according to one or more embodiments described and illustrated herein.

FIG. 3 illustrates a physical vehicle 100 and a plurality of corresponding virtual vehicles 125A-125F rendered and operated in a plurality of virtual worlds 120A-120F. The virtual worlds 120A-120F may be operated by different operating entities. In other examples, a single operating entity may operate more than one virtual world. As a non-limiting example, virtual world 120A and virtual world 120B may be operated as Minecraft worlds operated by Microsoft Corp., virtual world 120C may be a Fortnite virtual world operated by Epic Games, virtual world 120C and virtual world 120D may be Second Life worlds operated by Linden Research Inc., virtual world 120E and virtual world 102F may be Sims virtual worlds operated by Electronic Arts. In each case, the computing device(s) responsible for providing the virtual world receives the vehicle profile associated with the physical vehicle 100 and renders a virtual vehicle 125 in the virtual world 120.

The vehicle profile includes information associated with the physical vehicle 100, such as make, model, year, trim-level, color, and/or the like. The vehicle profile also includes the vehicle performance attributes of the physical vehicle 100. The computing device(s) of the virtual world accesses the vehicle profile and renders the virtual vehicle in accordance with the design aesthetic of the particular virtual world. Different virtual worlds have different design aesthetics. As a non-limiting example, the virtual vehicle may be rendered in a blocky manner in a Minecraft virtual world whereas the virtual vehicle may be rendered in a realistic manner in a Second Life virtual world. The vehicle profiles of the embodiments of the present disclosure enable virtual vehicles to be rendered and operated in any virtual world platform. The computing device(s) of the virtual world read the information from the vehicle profile and interpret it to render the vehicle in accordance with its own standards.

In some embodiments, the vehicle profile is tokenized and stored on a blockchain network as a non-fungible token. As a non-limiting example, a non-fungible token storing the vehicle profile may be minted on the Ethereum blockchain. Tokenizing ensures authenticity of the vehicle profile and maintains a one-to-one relationship between the physical vehicle 100 and the virtual vehicle 125. A user may rent, sell, loan or otherwise transfer the virtual vehicle 120 by transferring or providing access to the non-fungible token of the vehicle profile.

Figure 4:
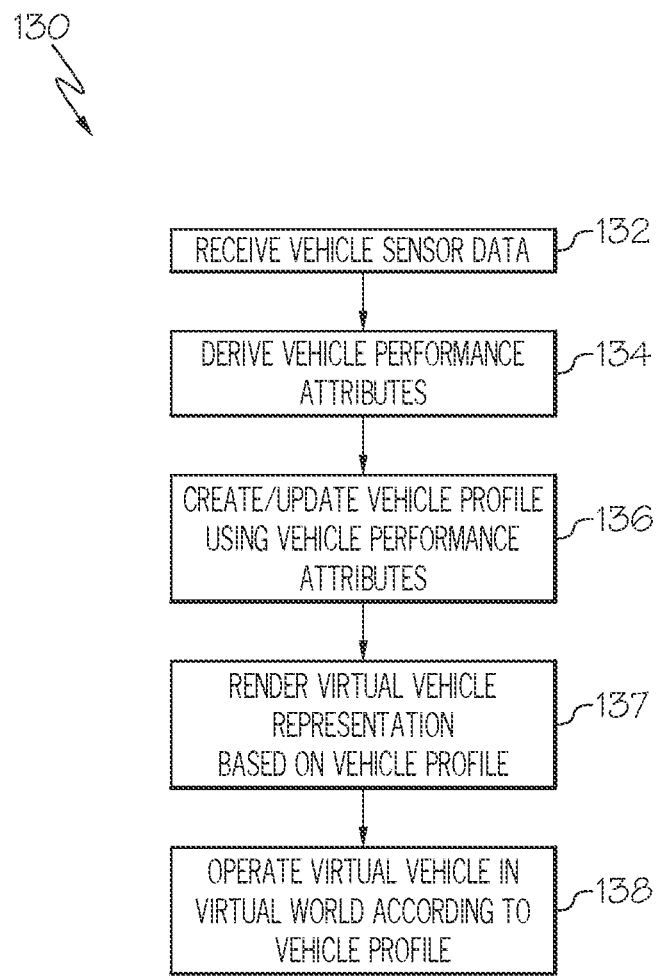
FIG. 4 illustrates a method for rendering and operating a virtual vehicle in a virtual world according to one or more embodiments described and illustrated herein.

FIG. 4 illustrates a user 126 viewing a virtual vehicle 125 using a virtual reality headset 127. It should be understood that the embodiments are not limited to viewing and using virtual vehicles using a virtual reality headset, and that any display device may be used. the virtual reality headset 127 renders the virtual vehicle from any perspective, such as when the user approaches the virtual vehicle 125, when the user is sitting in the cockpit and driving the virtual vehicle 125, or from different views of the virtual vehicle 125 while the user drives the virtual vehicle 125.

The virtual vehicle is rendered and operated in a manner according to the information stored within the vehicle profile. Thus, the performance of the virtual vehicle 125 in the virtual world 120 corresponds to the performance of the physical vehicle 100 in the physical world. For example, if the physical vehicle 100 has an average highway economy of 15 km/liter, then the corresponding virtual vehicle 125 will have an average highway economy of 15 km/liter in the virtual world 120. As another example, the virtual vehicle 125 will handle corners in the virtual world 120 in a manner similar to the corresponding physical vehicle 100 in the physical world. The owner may drive the virtual vehicle 125 in different virtual worlds 120 in a manner similar to the physical vehicle 100 in the physical world. The virtual vehicle 125 cannot exceed the performance of the corresponding physical world. For example, if the maximum speed of the physical vehicle is 200 kph, then the maximum speed of the virtual vehicle 125 in the virtual world 120 is 200 kph.

Modifications made by the owner of the physical vehicle 100 will be recorded by the vehicle sensors, and the vehicle performance attributes within the vehicle profile will be updated. As a non-limiting example, a user may upgrade the physical vehicle 100 with a turbo-boost system. Vehicle sensor data will reflect the change in acceleration performance of the physical vehicle 100 and the vehicle performance attribute(s) of the vehicle profile will be updated. The virtual vehicle 125 will then exhibit a corresponding change in acceleration performance.

In some embodiments, a calibration routine may be used to generate vehicle sensor data to create and/or update the various vehicle performance attributes. A graphical user interface may provide instructions to the owner of the physical vehicle to perform certain maneuvers to generate vehicle sensor data needed to create and/or update vehicle performance attributes. As a non-limiting example, a vehicle head unit may present the graphical user interface. As another non-limiting example, a mobile phone may display the graphical user interface. The instructions may include statements such as "Accelerate from a stop position to sixty miles per hour with the maximum accelerator pedal pressure" or "Handle the curve on Smith Road at 15 kph." In some embodiments, the calibration period may be a duration of time. In other embodiments, the vehicle profile is continuously updated as the owner drives the physical vehicle.

FIG. 4 is a flowchart 130 illustrating a method of generating rendering and operating a virtual vehicle that corresponds with a physical vehicle. The steps of the flowchart 130 may be performed by one or more of a vehicle computing system and a dedicated computing system responsible for generating the virtual world.

At block 132 vehicle sensor data is received. The vehicle sensor data is generated by any number of sensors on a physical vehicle. The vehicle sensor data is representative of the driving performance of the physical vehicle. Other data may also be received at block 132, such as weather data, map data, and any other relevant data.

At block 134, vehicle performance attributes are derived from the sensor data received at block 132. Vehicle performance attributes may be derived by the vehicle itself or a remote computing device. Vehicle performance attributes include efficiency, acceleration, maximum speed, and the like.

At block 136, a vehicle profile for the physical vehicle is created or updated with the vehicle performance attributes, depending on whether there yet exists a vehicle profile. The vehicle profile may also include other information regarding the physical vehicle, such as make, model, year, trim level, color, and/or the like. In some embodiments, the vehicle profile and its data is tokenized and minted on a blockchain as a non-fungible token. This non-fungible token may be used in different virtual worlds.

At block 137, a computing device responsible for rendering a virtual world reads the vehicle profile and generates a virtual vehicle accordingly. The virtual vehicle is displayed according to the make, model, year, trim, color, etc. stored in the vehicle profile.

At block 138, the computing device responsible for rendering the virtual world enables operation of the virtual vehicle in accordance with the vehicle performance attributes stored within the vehicle profile. Thus, the virtual vehicle performs similarly in a virtual world as the physical vehicle does in the physical world under similar conditions.

Figure 5:
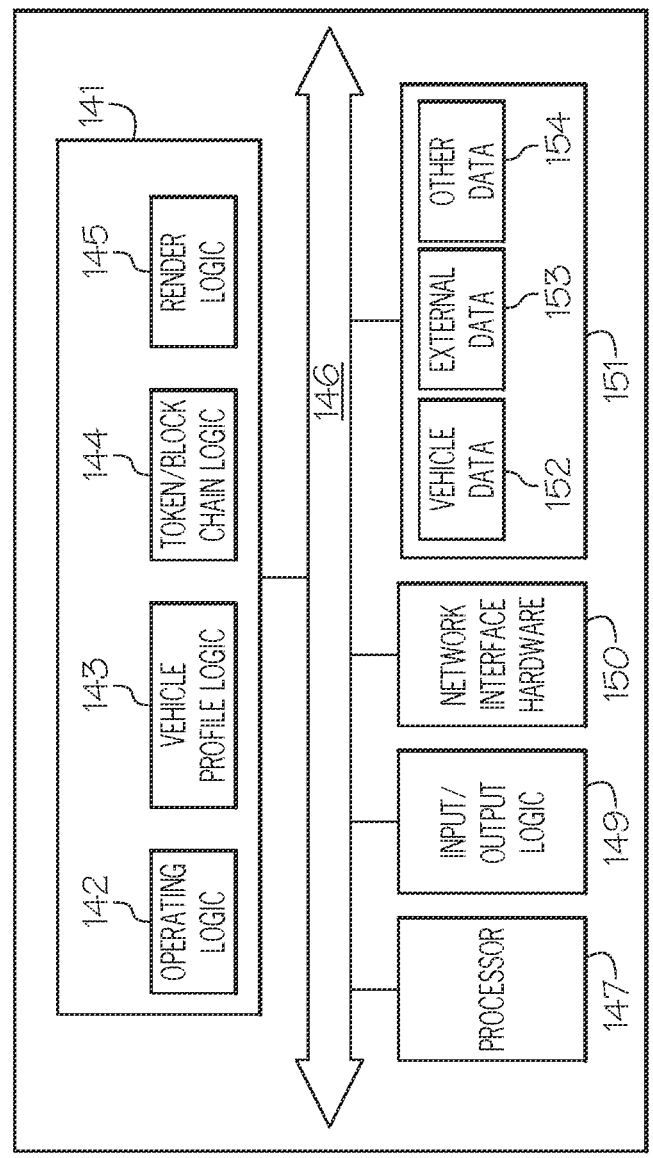
FIG. 5 illustrates an example computing system for rendering and operating a virtual vehicle in a virtual world according to one or more embodiments described and illustrated herein.

FIG. 5 depicts an example computing system 140 for performing the functionalities as described herein. The components of the computing system 140 may be provided in a single computing device or multiple computing devices in a network. The example computing system 140 includes one or more processors 147, a communication path 146, one or more memory modules 141, network interface hardware 150, and a data storage device 151, the details of which will be set forth in the following paragraphs. It should be understood that the computing system 140 of FIG. 5 is provided for illustrative purposes only, and that other computing systems comprising more, fewer, or different components may be utilized.

Each of the one or more processors 147 may be any device capable of executing computer readable and executable instructions. Accordingly, each of the one or more processors 147 may be a controller, an integrated circuit, a microchip, a computer, or any other computing device. The one or more processors 147 are coupled to a communication path 146 that provides signal interconnectivity between various modules of the computing system 140. Accordingly, the communication path 146 may communicatively couple any number of processors 147 with one another, and allow the modules coupled to the communication path 146 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 146 may be formed from any medium that is capable of transmitting a signal such as, for example, conductive wires, conductive traces, optical waveguides, or the like. In some embodiments, the communication path 146 may facilitate the transmission of wireless signals, such as WiFi, Bluetooth®, Near Field Communication (NFC) and the like. Moreover, the communication path 146 may be formed from a combination of mediums capable of transmitting signals. In one embodiment, the communication path 146 comprises a combination of conductive traces, conductive wires, connectors, and buses that cooperate to permit the transmission of electrical data signals to components such as processors, memories, sensors, input devices, output devices, and communication devices. Accordingly, the communication path 146 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The computing system 140 includes one or more memory modules 141 coupled to the communication path 146. The one or more memory modules 141 may comprise RAM, ROM, flash memories, hard drives, or any device capable of storing computer readable and executable instructions such that the computer readable and executable instructions can be accessed by the one or more processors 147. The computer readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into computer readable and executable instructions and stored on the one or more memory modules 141. Alternatively, the computer readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The one or more memory modules 141 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. The one or more memory modules 141 include logic in the form of computer readable instructions that perform the functionalities described herein, such as the operating logic 142, vehicle profile logic 143, the token/blockchain logic 144, and the render logic 145. Additional logic used to support these functionalities may be stored in the one or more memory modules 141 and/or in remote memory modules.

The operating logic 142 may include logic for effectuating the functionalities described herein, such as an operating system and/or a graphical user interface for facilitating user input. The vehicle profile logic 143 includes logic for creating and updating a vehicle profile associated with a physical vehicle. As a non-limiting example, the vehicle profile logic 143 may derive one or more vehicle performance attributes from sensor data of a physical vehicle, and store those vehicle performance attributes in the vehicle profile The vehicle profile logic 143 may also retrieve and store information relating to the physical vehicle, such as make, model, year, trim level and color. The token/blockchain logic 144, if provided, may include logic for tokenizing the vehicle profile that is generated and also minting an NFT of the vehicle profile on a blockchain. The render logic 145, if provided, includes logic for rendering a virtual vehicle in a virtual world according to the vehicle profile. It is noted that the vehicle profile logic 143, the token/blockchain logic 144, and/or the render logic 145 may be stored and executed on different computing devices, and are shown within the same computing device in FIG. 5 for convenience.

The data storage device 151, which may generally be a storage medium, may contain one or more data repositories for storing data that is received and/or generated, and may be any physical storage medium, including, but not limited to, a hard disk drive (HDD), memory, removable storage, and/or the like. While the data storage device 151 is depicted as a local device, it should be understood that the data storage device 151 may be a remote storage device, such as, for example, a server computing device or the like. In some embodiments, the data storage device 151 stores vehicle data 152 (e.g., vehicle profiles, information about the vehicle, vehicle sensor data, and/or vehicle performance attributes), external data 153 (e.g., weather data, map data, and the like) and other data 154, which may include any other data used by the system to generate artwork as described herein.

Still referring to FIG. 5, the computing system 140 may comprise network interface hardware 150 for communicatively coupling the computing system 140 to a remote computing device, such as, without limitation, a remote server. The network interface hardware 150 can be communicatively coupled to the communication path 146 and can be any device capable of transmitting and/or receiving data via a network. Accordingly, the network interface hardware 150 can include a communication transceiver for sending and/or receiving wireless communications. For example, the network interface hardware 150 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 150 includes hardware configured to operate in accordance with the Bluetooth® wireless communication protocol.

It should now be understood that embodiments of the present disclosure are directed to systems and methods for rendering an operating a virtual vehicle in a virtual world that corresponds to an actual physical vehicle. The virtual vehicle operating in the virtual world operates with similar characteristics of the physical vehicle in the physical world. In this way, a virtual vehicle is personalized and customized to match the owner's physical vehicle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A method of generating a vehicle profile for operating a virtual vehicle in a virtual environment, the method comprising:
receiving vehicle sensor data from at least one sensor corresponding to a physical vehicle;
determining at least one vehicle performance attribute from the vehicle sensor data; and
storing the at least one vehicle performance attribute in the vehicle profile, wherein:
the vehicle profile further comprises vehicle information data corresponding with the physical vehicle; and
the vehicle profile is operable to be used to render the virtual vehicle in the virtual environment based at least in part on the vehicle profile, and operate the virtual vehicle in the virtual environment based at least in part on the vehicle profile comprising the at least one vehicle performance attribute and the vehicle information data.

2. The method of claim 1, wherein the at least one sensor comprises a speedometer and the at least one vehicle performance attribute comprises acceleration.

3. The method of claim 1, wherein:
the at least one sensor comprises an energy sensor that outputs a remaining propulsion energy of the physical vehicle and an odometer sensor; and
the at least one vehicle performance attribute comprises energy efficiency.

4. The method of claim 1, wherein:
the at least one vehicle performance attribute is further based at least in part on environmental data; and
the operating of the virtual vehicle in the virtual environment is further based at least in part on virtual environmental data in accordance with the environmental data.

5. The method of claim 1, wherein:
the at least one sensor comprises one or more inertial measurement units;
the at least one vehicle performance attribute comprises a handling attribute; and the operating the virtual vehicle in the virtual environment further comprises operating the virtual vehicle in accordance with the handling attribute.

6. The method of claim 1, wherein the vehicle profile is stored in a non-fungible token.

7. A method of operating a virtual vehicle in a virtual environment, the method comprising:
receiving a vehicle profile corresponding to a physical vehicle, wherein the vehicle profile comprises at least one vehicle performance attribute derived from vehicle sensor data from at least one sensor of the physical vehicle, and the vehicle profile further comprises vehicle information data corresponding with the physical vehicle;
rendering the virtual vehicle in the virtual environment based at least in part on the vehicle profile; and
operating the virtual vehicle in the virtual environment based at least in part on the vehicle profile comprising the at least one vehicle performance attribute and the vehicle information data.

8. The method of claim 7, wherein the at least one sensor comprises a speedometer and the at least one vehicle performance attribute comprises acceleration.

9. The method of claim 7, wherein:
the at least one sensor comprises an energy sensor that outputs a remaining propulsion energy of the physical vehicle and an odometer sensor; and
the at least one vehicle performance attribute comprises energy efficiency.

10. The method of claim 7, wherein:
the at least one vehicle performance attribute is further based at least in part on environmental data; and
the operating of the virtual vehicle in the virtual environment is further based at least in part on virtual environmental data in accordance with the environmental data.

11. The method of claim 7, wherein:
the at least one sensor comprises one or more inertial measurement units;
the at least one vehicle performance attribute comprises a handling attribute; and
the operating the virtual vehicle in the virtual environment further comprises operating the virtual vehicle in accordance with the handling attribute.

12. The method of claim 7, wherein the vehicle profile is stored in a non-fungible token.

13. A system of operating a virtual vehicle in a virtual environment comprises:
one or more processors; and
a non-transitory, computer-readable medium storing instructions that, when executed by the one or more processors, cause the one or more processors to:
receive a vehicle profile corresponding to a physical vehicle, wherein the vehicle profile comprises at least one vehicle performance attribute derived from vehicle sensor data from at least one sensor of the physical vehicle, and the vehicle profile further comprises vehicle information data corresponding with the physical vehicle;
render the virtual vehicle in the virtual environment based at least in part on the vehicle profile; and
operate the virtual vehicle in the virtual environment based at least in part on the vehicle profile comprising the at least one vehicle performance attribute and the vehicle information data.

14. The system of claim 13, wherein the at least one sensor comprises a speedometer and the at least one vehicle performance attribute comprises acceleration.

15. The system of claim 13, wherein:
the at least one sensor comprises an energy sensor that outputs a remaining propulsion energy of the physical vehicle and an odometer sensor; and
the at least one vehicle performance attribute comprises energy efficiency.

16. The system of claim 13, wherein:
the at least one vehicle performance attribute is further based at least in part on environmental data; and
the operating of the virtual vehicle in the virtual environment is further based at least in part on virtual environmental data in accordance with the environmental data.

17. The system of claim 13, wherein the vehicle profile is stored in a non-fungible token.

* * * * *

UNITED STATES PATENT AND TRADEMARK OFFICE
CERTIFICATE OF CORRECTION

| | | |
|---|---|---|
| PATENT NO. | : 12,094,274 B2 | Page 1 of 1 |
| APPLICATION NO. | : 17/935722 | |
| DATED | : September 17, 2024 | |
| INVENTOR(S) | : David Tsai and William Hargis | |

It is certified that error appears in the above-identified patent and that said Letters Patent is hereby corrected as shown below:

On the Title Page

Item (72), remove "Will", insert --William--.

Signed and Sealed this
Twenty-second Day of April, 2025

Coke Morgan Stewart
*Acting Director of the United States Patent and Trademark Office*